United States Patent
Zykh et al.

(10) Patent No.: US 12,380,475 B2
(45) Date of Patent: Aug. 5, 2025

(54) SYSTEMS AND METHODS FOR AUTOMATED RESPONSE TO ONLINE REVIEWS

(71) Applicant: THE TORONTO-DOMINION BANK, Toronto (CA)

(72) Inventors: Igor Zykh, Voorhees, NJ (US); Blaise F. Stanek, Ridgewood, NJ (US); John S. Griffin, Toms River, NJ (US); Kenneth Hampel, Yardley, PA (US); Deepak R. Padhye, Chester Springs, PA (US); Sai Jarugula, Wellington, FL (US)

(73) Assignee: THE TORONTO-DOMINION BANK, Toronto (CA)

(*) Notice: Subject to any disclaimer, the term of this patent is extended or adjusted under 35 U.S.C. 154(b) by 872 days.

(21) Appl. No.: 17/478,528

(22) Filed: Sep. 17, 2021

(65) Prior Publication Data

US 2023/0086653 A1    Mar. 23, 2023

(51) Int. Cl.
- *G06Q 30/0282* (2023.01)
- *G06F 40/35* (2020.01)
- *G06F 40/40* (2020.01)
- *G06F 40/58* (2020.01)

(52) U.S. Cl.
CPC ......... *G06Q 30/0282* (2013.01); *G06F 40/35* (2020.01); *G06F 40/58* (2020.01); *G06F 40/40* (2020.01)

(58) Field of Classification Search
CPC ................ G06F 40/35; G06F 40/40
See application file for complete search history.

(56) References Cited

U.S. PATENT DOCUMENTS

| 7,606,714 B2 | 10/2009 | Williams et al. |
| 9,742,912 B2 | 8/2017 | Srivastava et al. |
| 9,866,516 B1 | 1/2018 | Fisher et al. |

(Continued)

FOREIGN PATENT DOCUMENTS

EP    3031030 A4    2/2015

OTHER PUBLICATIONS

"Smart Review Response," Brandify, Accessed: May 21, 2021, https://www.brandify.com/products/reputation/smart-review-response.

*Primary Examiner* — Daniel C Washburn
*Assistant Examiner* — Athar N Pasha

(57) ABSTRACT

A computer implemented system and method is provided for responding to textual reviews. The method comprises: receiving harvested content comprising a text segment and associated with an entity; determining a primary intent of the text segment determined by reviewing a set of utterances in the text segment of the harvested content and comparing the set of utterances to example utterances associated with a set of pre-defined intents, the primary intent having a highest similarity to the set of utterances in the text segment as compared to other deduced intents and associated utterances. The method comprises assigning a confidence score associated with determining the primary intent. If the confidence score exceeds a first threshold, generating an automated response, based on the primary intent and automatically responding to the harvested content with the automated response having the customized sentence segment where the confidence score exceeds a second threshold score.

22 Claims, 7 Drawing Sheets

(56) References Cited

U.S. PATENT DOCUMENTS

| | | | |
|---|---|---|---|
| 10,339,925 | B1 | 7/2019 | Rastrow et al. |
| 10,585,991 | B2 | 3/2020 | Miller et al. |
| 10,762,438 | B1 | 9/2020 | Zhang |
| 10,762,892 | B2 | 9/2020 | Rusak et al. |
| 10,997,250 | B2 | 5/2021 | Asur et al. |
| 10,997,373 | B2 | 5/2021 | Bhowal et al. |
| 11,080,072 | B1 * | 8/2021 | Malament ............ G06F 8/34 |
| 11,756,094 | B2 * | 9/2023 | Fan ............ G06F 16/24573 707/739 |
| 11,842,156 | B2 * | 12/2023 | Campos Ortega .... G06F 40/103 |
| 2012/0054187 | A1 * | 3/2012 | Priyadarshan ......... G06F 16/24 709/219 |
| 2013/0218884 | A1 * | 8/2013 | McConnell ......... G06F 16/951 707/E17.005 |
| 2015/0120618 | A1 * | 4/2015 | Hong ............... G10L 13/04 706/11 |
| 2020/0151777 | A1 * | 5/2020 | Casalino .......... G06Q 30/0282 |
| 2020/0233908 | A1 * | 7/2020 | Abe ............... G10L 25/63 |
| 2020/0327197 | A1 * | 10/2020 | Bhowal ............ G06N 5/041 |
| 2021/0049476 | A1 | 2/2021 | Davis et al. |
| 2021/0064828 | A1 | 3/2021 | Johnson Premkumar et al. |
| 2021/0110816 | A1 * | 4/2021 | Choi ............... G10L 15/063 |

\* cited by examiner

| Intent Classification Name | Description | Example Utterances |
|---|---|---|
| Attrition Risk | Indications that a Customer may leave the bank. Also used as a catch all for bad experiences that can't be classified further. | "I'm closing my account", "I'm taking my business elsewhere", "Terrible customer experience" |
| None | A catch all common in language based models | |
| ReportAvailabilityIssues | A location or service at a location is not available | "The hours are terrible", "The ATM never works" |
| ReportEmployeeMisconduct | A customer feels that they have been treated poorly or unfairly | "The manager is very rude", "Tellers are always obnoxious and nasty" |
| ReportGoodService | A positive review (we do get them ) | "The staff is always helpful and kind", "A great customer experience" |
| ReportInabilityToHelp | Indications that a customer's needs were not met | "There was nothing they could do", "No one could help me" |
| ReportPoorConditions | Facilities-related complaints | "The place is always a mess" |
| ReportSlowDriveThru | Drive thru delays and throughput concerns | "Too many cars in line", "not enough lanes open" |
| ReportSlowService | General delays and throughput concerns | "Wait times are too long", "It takes forever" |
| ReportTheftOrFraud | Any indications of that the customer feels they were the victim of fraud or theft | "They stole my money", "They are a bunch of thieves" |

Fig. 4

SYSTEMS AND METHODS FOR AUTOMATED RESPONSE TO ONLINE REVIEWS

FIELD

The present disclosure relates generally to analyzing and automatically responding to online reviews, and specifically to generating a customized response by determining intent.

BACKGROUND

Customers take time and effort to post online reviews. Such reviews may relate to interactions with an e-commerce platform, online social media platforms or applications, online services and/or products offered by an entity's website, etc. Responding to these reviews helps improve the customer experience by ensuring that customers are heard and their concerns are addressed. Responding to online reviews may also help boost search engine optimization results thereby improving a business' online presence. Additionally, responding accurately and effectively to online reviews would help ensure that customers continue to interact with the corresponding online platforms as their issues are addressed. However, the process of manually responding to these customer reviews with customized responses across multiple online platforms is both labour intensive and time consuming. Online reviews left unanswered can contribute to negative customer experiences by leaving customers feeling ignored after they have taken the time and effort to post their reviews. On the other hand, existing automated response techniques rely on generic responses which lose the customer's interest and cause a customer to cease online engagement with the online platform.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer system for automatically responding to harvested content, such as an online review containing text. The computer system also includes a computer processor; and a non-transitory computer-readable storage medium storage having instructions that when executed by the computer processor perform actions may include: receiving harvested content may include a text segment and associated with an entity; determining a primary intent of the text segment associated with the harvested content, where the primary intent is determined by reviewing a set of utterances in the text segment of the harvested content and comparing the set of utterances to example utterances associated with a set of pre-defined intents, the primary intent selected from the pre-defined intents based on having a highest similarity to the set of utterances in the text segment; assigning a confidence score associated with determining the primary intent based on a degree of match between the utterances in the text segment and the example utterances in the primary intent; if the confidence score exceeds a first threshold score, generating an automated response, based on the primary intent, to the harvested content, where the automated response is generated by: selecting, based on the primary intent, a sentence segment from a set of pre-defined segments, each sentence segment having gaps in a sentence and combining with randomly selected inserts for the gaps to customize the sentence segment. The system also includes automatically responding to the harvested content with the automated response having the customized sentence segment where the confidence score exceeds a second threshold score. Other embodiments of this aspect include corresponding computer systems, apparatus, and computer programs recorded on one or more computer storage devices, each configured to perform the actions of the methods.

Implementations may include one or more of the following features. The system where the harvested content may include user input content collected from one or more websites providing an online review of at least one product or service for the entity. The system the actions may include: determining a first language of the online review and translating the online review from the first language to a second language associated with the pre-defined intents. The first threshold score is configurable on a user interface of a computing device for managing the online reviews. The second threshold score is configurable on the user interface of the computing device. The automated response is generated unique to a set of online reviews defined by region or time. The primary intent is selected by determining a set of possible intents from each of the utterances and selecting one of the possible intents for having a highest confidence score for matching between the utterances in the text segment of the online review to the example utterance associated with the primary intent. Automatically responding to the online review further may include updating the automated response with another combination of pre-defined sentence segments and selected inserts if the automated response matches a prior response generated in response to a prior online review at a same location to the location of the online review. The action of generating the automated response further may include: automatically selecting at least one additional greeting segment to precede the sentence segment in the automated response, the one additional greeting segment selected from a set of pre-defined greeting segments common to all of the pre-defined intents for the entity and including a set of sentence gaps for being filled with randomly generated inserts associated with the greeting segments. The actions may include applying a machine learning model for grouping the utterances in the text segment of the online review to example utterances in the pre-defined intents and selecting a group having similar language properties to the utterances as the primary intent. Implementations of the described techniques may include hardware, a method or process, or computer software on a computer-accessible medium.

One general aspect includes a non-transitory computer-readable storage medium may include instructions executable by a processor to configure the process for automatically responding to harvested content. The non-transitory computer-readable storage medium also includes receiving harvested content may include a text segment and associated with an entity; determining a primary intent of the text segment associated with the harvested content, where the primary intent is determined by reviewing a set of utterances in the text segment of the harvested content and comparing the set of utterances to example utterances associated with a set of pre-defined intents, the primary intent selected from the pre-defined intents based on having a highest similarity to the set of utterances in the text segment; assigning a confidence score associated with determining the primary intent based on a degree of match between the utterances in the text segment and the example utterances in the primary intent; if the confidence score exceeds a first threshold score, generating an automated response, based on the primary intent, to the harvested content, where the automated response is generated by: selecting, based on the primary intent, a sentence segment from a set of pre-defined segments, each sentence segment having gaps in a sentence and combining with randomly selected inserts for the gaps to customize the sentence segment; and. The medium also includes automatically responding to the harvested content with the automated response having the customized sentence segment where the confidence score exceeds a second threshold score. Other embodiments of this aspect include corresponding computer systems, apparatus, and computer programs recorded on one or more computer storage devices, each configured to perform the actions of the methods.

One general aspect includes a computer implemented method for responding to harvested content. The computer implemented method also includes receiving harvested content may include a text segment and associated with an entity; determining a primary intent of the text segment associated with the harvested content, where the primary intent is determined by reviewing a set of utterances in the text segment of the harvested content and comparing the set of utterances to example utterances associated with a set of pre-defined intents, the primary intent selected from the pre-defined intents based on having a highest similarity to the set of utterances in the text segment; assigning a confidence score associated with determining the primary intent based on a degree of match between the utterances in the text segment and the example utterances in the primary intent; if the confidence score exceeds a first threshold score, generating an automated response, based on the primary intent, to the harvested content, where the automated response is generated by: selecting, based on the primary intent, a sentence segment from a set of pre-defined segments, each sentence segment having gaps in a sentence and combining with randomly selected inserts for the gaps to customize the sentence segment; and, automatically responding to the harvested content with the automated response having the customized sentence segment where the confidence score exceeds a second threshold score. Other embodiments of this aspect include corresponding computer systems, apparatus, and computer programs recorded on one or more computer storage devices, each configured to perform the actions of the methods.

BRIEF DESCRIPTION OF THE DRAWINGS

These and other features will become more apparent from the following description in which reference is made to the appended drawings wherein:

FIG. 4 is a diagram illustrating an example of a mapping table providing an example relationship between a set of defined intents, associated attributes and example utterances for use by the response computing device of FIGS. 1A-1B and 2, in accordance with an embodiment.

DETAILED DESCRIPTION

Figure 1A:
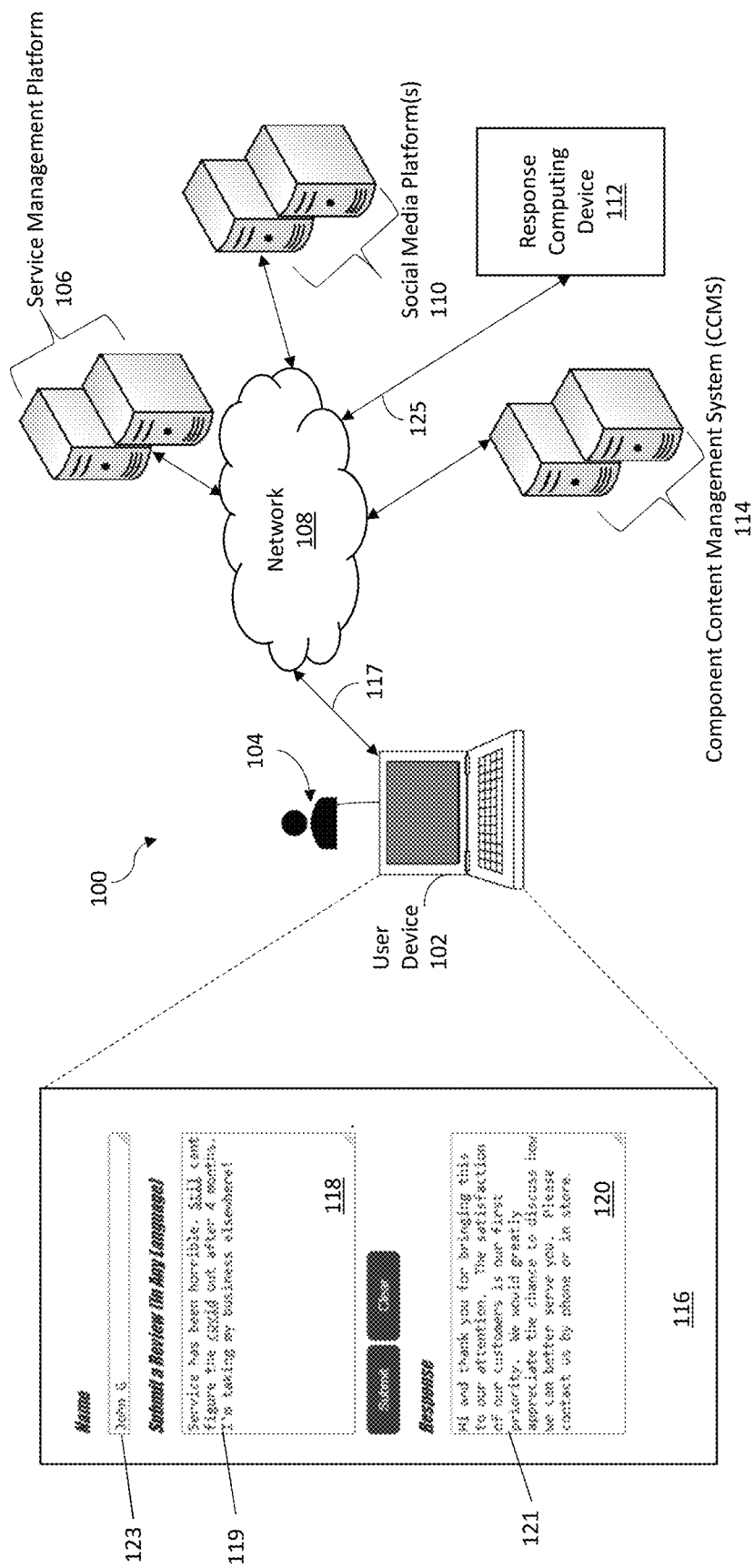
FIG. 1A is a diagram illustrating an example response computing device communicating in a communication network and configured to output for display a customized response to harvested content, such as an online review provided by a user, collected from one or more computing devices of the networked system of FIG. 1A, in accordance with an embodiment.

FIG. 1A illustrates an example review response system 100 according one embodiment. The review response system 100 may generally be configured to analyze collected user input content provided online via one or more websites, e.g. harvested content 117, relating to products or services offered by an entity (e.g. e-commerce entity, online financial services entity, etc.). The harvested content 117 may include online review(s) for the products or services offered by the entity and provided via a native application on a user device 102, via accessing one or more websites relating to the entity, such as accessing social media websites via social media platform(s) 110, or provided by other means to the system 100. The user input content, also referred to as harvested content 117, may be provided by a user 104 in a text format (e.g. either directly in a text format or otherwise in another format such as audio and converted to text via text to speech, etc.) on a user device 102, via accessing social media platforms 110, or other websites or applications relating to the entity providing the product or service.

Referring to FIG. 1A, shown is an example of the user device 102, using a graphical user interface (GUI) 116 to receive input content 119 in a first view portion 118 of a display to perform an action, such as to determine a response to the input content 119, as shown in an example response 121 in a second view portion 120. The system 100 is configured to determine a customized and uniquely generated response to the query or review provided in the input content 119. An example of such uniquely generated response is shown as example response 121 in the second view portion 120. The input content 119 and the response 121 illustrated in FIG. 1A and FIG. 1C are provided as examples for visualization purposes, other content for the input content 119 and the response 121 may be envisaged. The graphical user interface 116 may collect additional information relating to a review, such as identifying information for the user 104 providing the review and offering entity to which review relates.

The input content 119 providing the harvested content 117 may be entered by a user (e.g. user 104) at the user device 102, such as via the GUI 116 or received from another computing device in the system 100, such as another computing device in communication with the social media platforms 110.

In some aspects, the harvested content 117 may be stored on a component content management system (CCMS) 114.

In some aspects, the component content management system 114 may be configured to manage content at a granular level (component) instead of at the document level. In the component content management system 114, each component represents a single topic, concept of asset (e.g. an image, a table, product description, etc.). In the current embodiment, the harvested content 117 may be stored on a component level based on the product or service to which the user input content relates to. The CCMS 114 is further configured to tracks digital links, versions of content, and metadata associated with each component for the harvested content 117. Advantageously, the CCMS 114 provides improved control and flexibility of searching for the content (e.g. as it may classify content according to the components, such as product descriptions, etc.). Preferably the CCMS 114 allows content stored therein to be managed at the level of words, sentences, paragraphs, topics, concepts, or assets (e.g. image, table, product description, etc.) through the use of an XML-based data model. The CCMS 114 further allows improved searchability since content stored therein for the harvested content 117 is broken down further into smaller topics.

In some implementations, referring to FIGS. 1A-C and 2, the online review content and associated metadata (e.g. input content 119) provided in the harvested content 117 may initially pass through the service management platform 106 (e.g. service cloud) prior to being accessed by the other computing devices in the system 100, including the response computing device 112. The service management platform 106 may be configured to assign each online review as a case and manage each case therefrom. Additionally, in some aspects, online reviews from various social media platforms 110 may be accessed and sourced using an application programming interface (API) and submitted to the service management platform. The service management platform 106 may be additionally configured to "listen" for review content provided by the system 100 in FIG. 1A, including a variety of social media platforms 110 and automatically route the review to the appropriate computing device in FIG. 1A for response (e.g. response computing device 112).

For simplicity of illustration, a single computing user device 102 is shown but multiple user devices may be envisaged for receiving user 104 input content providing content defining a response to services or products offered by an entity, e.g. an online review. The user device 102 has been shown as a laptop computer, but other types of computing devices, such as mobile devices, smartphones, a personal digital assistant (PDA), a tabletop computer, a tablet computer, a portable gaming device, an e-book reader, a smart watch, other smart devices, a personal intelligent virtual assistant, or other computing device may be envisaged.

Accordingly, the harvested content 117 may relate to collecting a set of entries for input content 119 provided from various sources (e.g. multiple user devices 102, multiple instances of use of the GUI 116, access of social media platform 110 via the user devices 102, etc.) but relating to a similar topic of review and/or provided by a same user 104, e.g. a similar product or service offered by the entity of interest.

Generally, the system 100 may be configured to analyze, via a response computing device 112, the harvested content 117 providing the online review. As discussed above, an example of at least one input content for the harvested content 117 is shown in the first view portion 118. The response computing device 112 is configured to determine an automated response 125 to the input review provided via the user device 102 and instruct the display of the response on the user device 102 (e.g. may be displayed as the response 121 in the second view portion 120). As will be described herein, in one embodiment, the response computing device 112 may be configured to display one or more configurable thresholds which control whether a generated response is automatically approved by the response computing device 112 (e.g. a first threshold) and whether the generated automated response 125 is automatically sent to the user device 102 and instructing the user device 102 to display the response thereon, such as via the GUI 116.

Figure 1B:
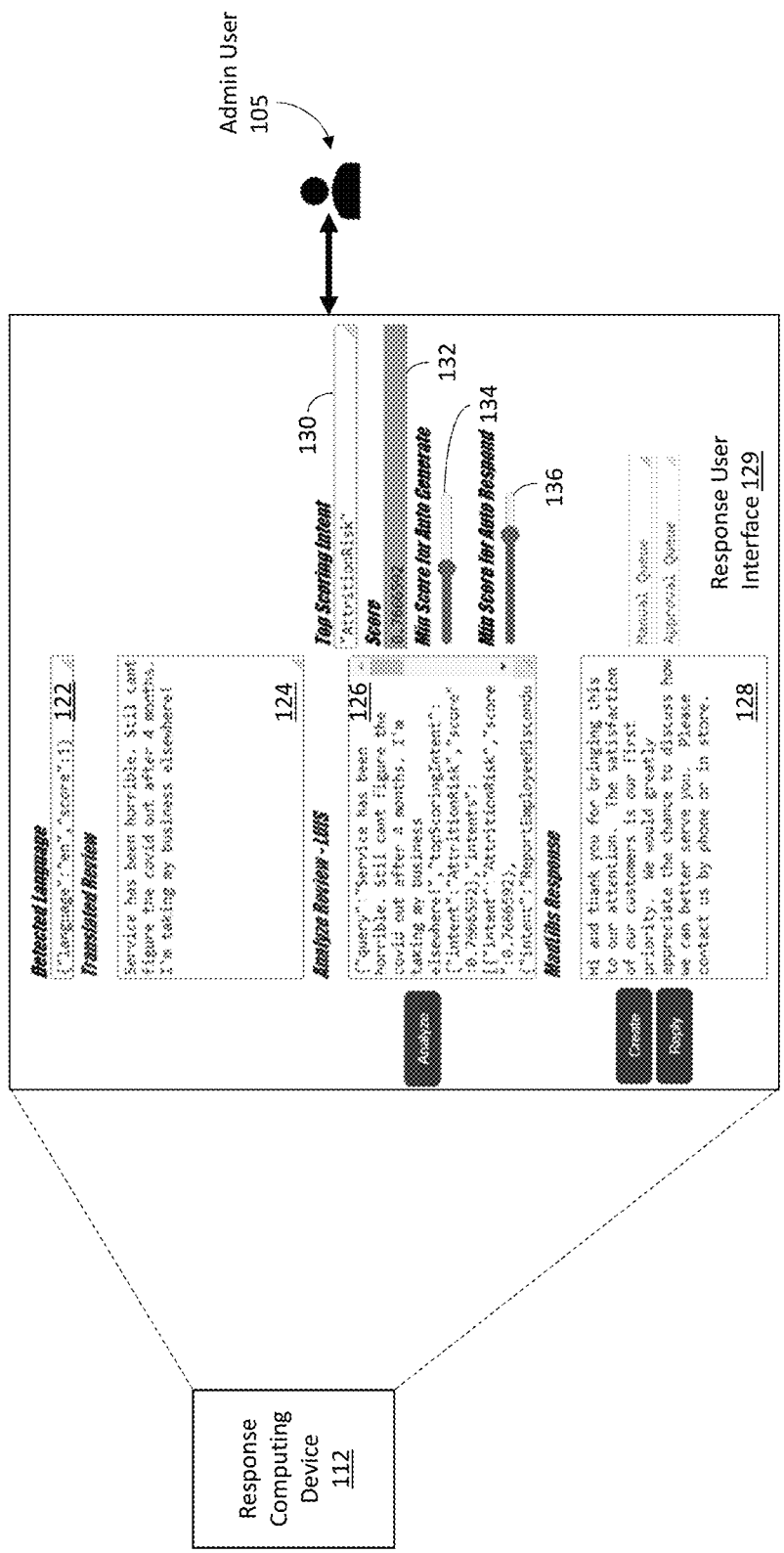
FIG. 1B is a diagram illustrating an example of an output display screen, or portions thereof, on a user interface of the response computing device of FIG. 1A for processing harvested content including review content and generating a response, in accordance with an embodiment.
Figure 1C:
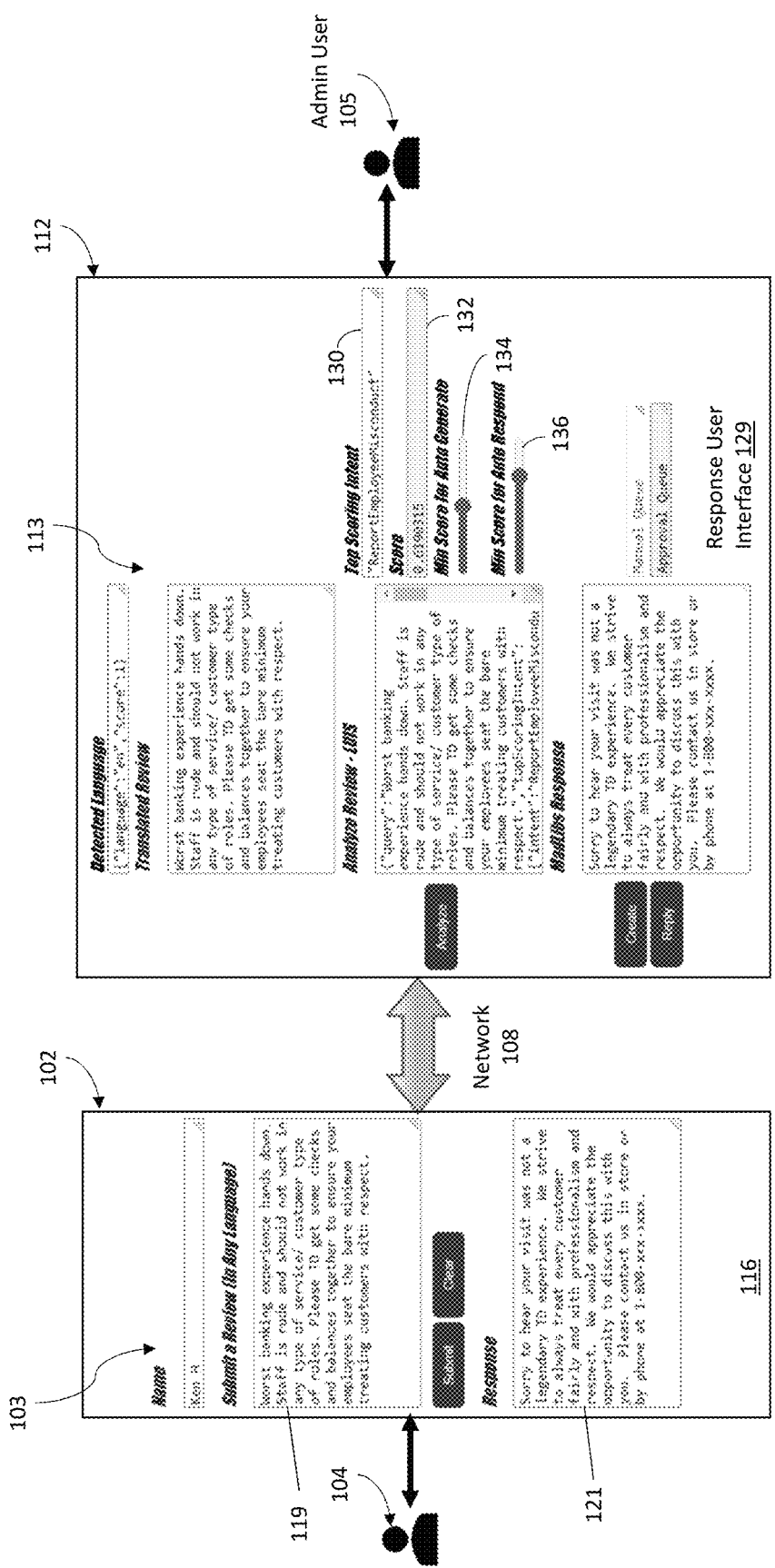
FIG. 1C is a diagram illustrating example output views, or portions thereof, of the graphical user interfaces for the user device and the response computing device of FIG. 1A, in accordance with an embodiment.

Referring to FIGS. 1A and 1B, in at least some implementations of the system 100, in order to automatically generate unique responses such as the automated response 125 (e.g. shown as the example response 121) in response to the harvested content 117 containing a review of an item, the response computing device 112 uses a computer-implemented process that combines defined sentence segments and defined sentence inserts, a selection of each segment and insert may also be based on determining a primary intent attributed to the text for the online review in the harvested content 117. Conveniently, in at least some aspects, the various combinations of possible segments and inserts results in a large number permutations and generates unique responses (e.g. automated response 125), to the online review provided in the harvested content 117, the responses being customized to a primary intent determined by analyzing content and context of the harvested content 117. Further conveniently, in at least some aspects, the response computing device 112 provides a set of customizable first and second thresholds (e.g. first threshold 134 and second threshold 136 in FIG. 1B) via a user interface (e.g. response user interface 129 in FIG. 1B) of the response computing device 112 to an admin user 105 such as to allow defining acceptable ranges of confidence scores for generating the automated response (e.g. for further review) in dependence upon the first threshold 134 being met and transmitting the generated response to the user on the platform which the review was received on (e.g. displaying on graphical user interface 116), in response to the second threshold 136 being met.

In at least some embodiments, the ability to automatically respond to online reviews with uniquely generated responses that address the intent of the customers when posting the online reviews may facilitate generation of effective contextual responses and reduce computing resources as it streamlines the process.

In at least some aspects, the disclosed system and method may automatically or semi-automatically respond to online reviews with unique and customized responses that address the intent of each online review made by customers.

Referring to FIGS. 1A and 1B, the response computing device 112 is configured to determine (e.g. via a language understanding model 258 shown in FIG. 2) a primary intent of the received review from the harvested content 117. The determination of the intent may for example consider one or more utterances such as one or more words, parts of a sentence, paragraph, discourse, in a passage of the online review in the input content 119 (which forms the harvested content 117) to determine its predicted intent, meaning or context. An example of such analysis is shown in analyzed review information 126 in FIG. 1B.

An utterance may thus be a portion of a sentence or passage in the online review provided in the input content 119 which conveys a complete meaning of the review through a combination of words. Generally, an utterance may take sentence form in some aspects but also refer to a communicative unit (e.g. a portion of text which provides indication of the meaning or context intended).

The intent determination performed by the response computing device 112 may consider the utterances in the text, e.g. words that surround other words in the received review of the harvested content 117 and the impact of their meaning providing a setting in which the review occurs. The determination of the intent via the response computing device 112 (e.g. the language understanding model 258 in FIG. 2) may occur in some implementations using machine learning models with the models trained using previously defined intent(s) for passages of text or set of words, or various combinations of words in passages (e.g. utterances) to predict an intent for the current review in the harvested content. The machine learning model used by the language understanding model 258 in FIG. 2 may thus predict a set of intents, from which one of the intents having a highest confidence score relative to the other intents may be considered as a primary intent or top scoring intent as discussed herein and having an associated confidence score depicting the confidence of the machine learning model or other prediction model in determining what the primary intent of the harvested content 117 is. FIG. 1B illustrates an example of information displayed on a user interface 129 of the response computing device 112 relating to the collected review via the harvested content 117, example visualizations of the steps for processing the review and determination of the primary intent, including a display of the processed review information 124 (e.g. which may have been translated from a first language to a second defined language), a detected language information 122 for the language associated with the received review, analyzed review information 126 providing an analysis of the review (e.g. into its utterances), a generated response 128. Additionally, the response user interface 129 may be configured for displaying customizable thresholds for auto-generation of a response to the review (e.g. first threshold 134) and another threshold for auto-transmission of a generated response (e.g. second threshold 136) on a response user interface 129. The response user interface 129 may also display primary intent information 130 indicating a primary predicted intent for the review (e.g. "Attrition Risk"); and score information 132 indicating an associated confidence score for the primary intent determined from the review information 124, as analyzed in the analyzed review information 126 to determine the score.

In some implementations of the response computing device 112, to attribute a primary intent (also referred to as a top scoring intent, shown as the primary intent information 130 in FIG. 1B) of the review provided in the harvested content 117 and then assign that attribution a confidence score (e.g. confidence score information 132), the response computing device 112 is configured to determine a degree of match between at least portions of the text in the online review (e.g. analyzed portions of the review shown as analyzed review information 126) and a set of previously stored example intents along with associated text used to determine the primary intent. Based on the confidence score exceeding a first threshold confidence score, the system 100, via the response computing device 112, may generate an automated response (e.g. response information 128 sent as the automated response 125) to the review for subsequent review and/or automatic transmission to the user device 102 for display thereon. Based on the confidence score (e.g. confidence score information 132) exceeding a second threshold (e.g. the second threshold 136), the system 100 may additionally automatically respond with that automated response (e.g. the response information 128 sent as the automated response 125) and the system 100 may route the response to a graphical user interface 116 for a computer device such as the user device 102 associated with the user 104 providing the review.

Referring again to FIG. 1B, the response user interface 129 is configured to provide an interface to review the received review information 124, analyze the review information as in the analyzed review information 126, and create a response to the review, in the response information 128. The response user interface 129 also allows modification of the response information 128 via the admin user 105, when configured for such input. The response user interface 129 conveniently displays a set of customizable threshold controls, shown as a slider bar in FIG. 1B, for selecting a minimum score to auto generate a response to the review, shown as the first threshold 134, and another selectable interface control, such as a slider bar, for selecting and setting a minimum score for auto responding shown as the second threshold 136. The response user interface 129 also allows viewing of the score information 132 so that the admin user 105 may adjust thresholds based on viewing the score attributed to the currently analyzed review in the review information 124.

Referring now to FIG. 1C, shown is a diagram providing example views of the user interface screens for the user device 102 and the response computing device 112 of FIG. 1A, the computing devices being in communication with one another across the network 108. In the example of FIG. 1C, a user view 103 is presented on the graphical user interface 116 of the user device 102. The user view 103 may be provided to the user 104 accessing one or more websites on the user device 102, including social media platforms to collect, from the user 104, an online review of a product, service or other offering from an entity. As shown in FIG. 1A, such online reviews may be collected across multiple computing devices to form the harvested content 117. The top portion of the user view 103 illustrates collecting the online review (e.g. input content 119) and attributes for the user 104. In response to the input review, the user device 102 communicates with the response computing device 112 to provide the input content 119 as part of the harvested content 117 for subsequent analysis and processing. The response user interface 129 illustrates via an admin view 113 to the admin user 105, various fields for processing and analyzing the review. The view 113 also presents user interface control buttons for controlling the analysis of the review received to generate a response, including the selection of the threshold levels (e.g. the first threshold 134, the second threshold 136). Similar to the operation of the response computing device 112 described with reference to FIG. 1B, the admin view 113 processes the received review, generates a translation (if necessary), generates a textual analysis of the review which includes breaking down the text in the review into utterances and determining a primary intent of the utterances in the text. The primary intent as determined by the response computing device 112 may be shown as the primary intent information 130. The score associated with the primary intent is then displayed in the score information 132 along with a set of configurable thresholds for adjusting the auto generation of the response and/or auto transmission of the response back to the user device 102. As shown in FIG. 1C, once a response to the review provided as the input content 119 is determined, such response is then transmitted by the response computing device 112 back to the user device 102 for display (e.g. see the response 121 in the user view 103).

Referring to FIG. 1A, the response computing device 112, the service management platform 106 (e.g. a service cloud), the social media platform(s) 110, the component content management system (CCMS), and the user device 102 are coupled for communication to one another via a communications network 108, which may be a wide area network (WAN) such as the Internet. Additional networks may also be coupled to the WAN of network 108 such as a wireless network and/or a local area network (LAN) between the WAN and computing devices shown in FIG. 1A.

Figure 2:
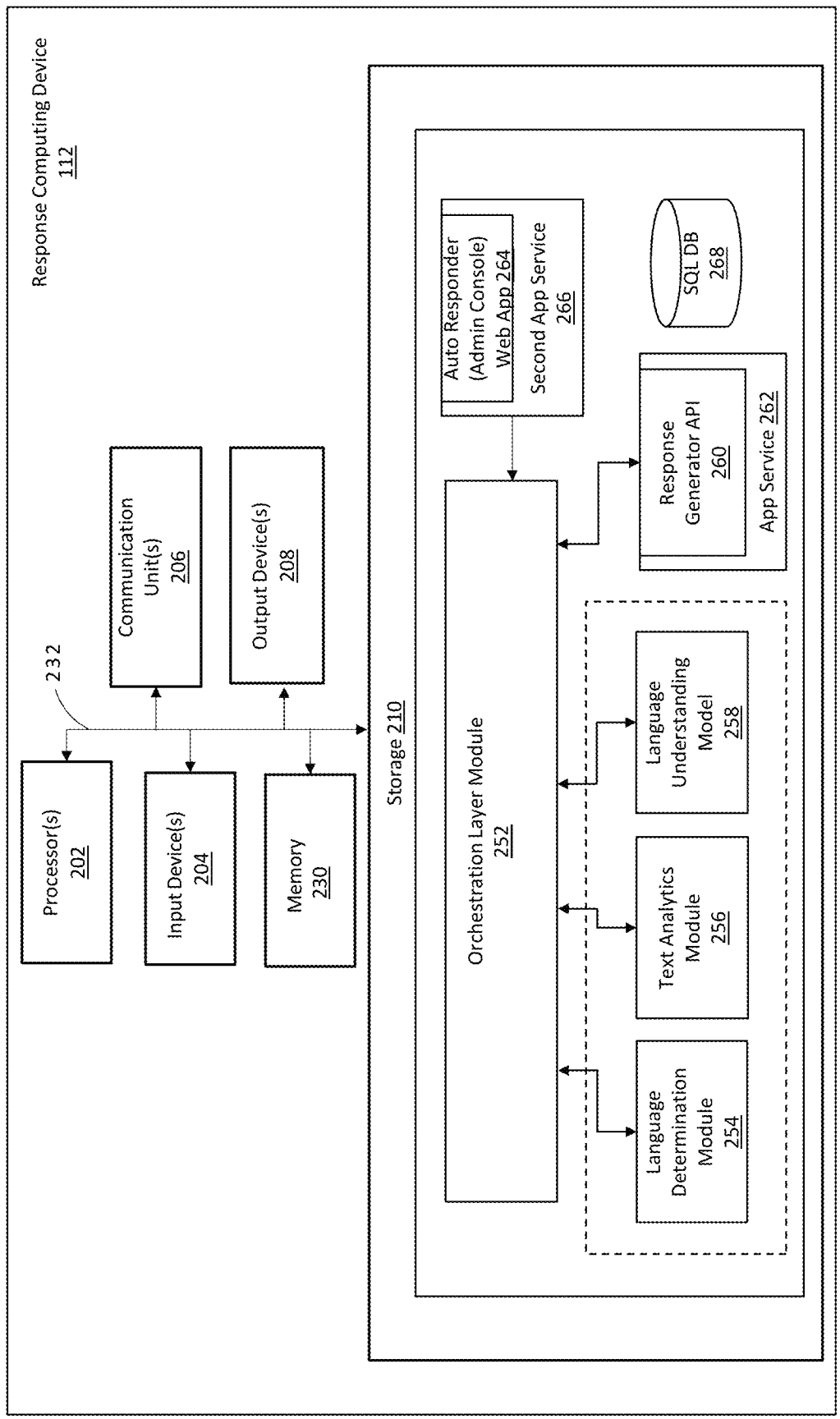
FIG. 2 is a block diagram of example computing components of the response computing device of FIG. 1A, in accordance with an embodiment.

FIG. 2 illustrates example computer components of the response computing device 112 of FIGS. 1A, 1B and 1C, in accordance with one or more aspects of the present disclosure, for example, to automatically generate and instruct display of an automated response to a received online review comprising a text segment provided by a user relating to experience with at least one product or service offered by an entity associated with the system 100. In at least some implementations of FIGS. 1A-1C, the response computing device 112 is configured for analyzing each individual online review (e.g. input content 119 gathered as harvested content 117) and applies predictive analytics via the response computing device 112 to determine at least one primary intent of the review and thus determine whether and how to automatically generate a response and if applicable thresholds met, respond to the review depending on the confidence score assigned to the primary intent for the online review.

The response computing device 112 comprises one or more processors 202, one or more input devices 204, one or more communication units 206, one or more output devices 208 and a memory 230. Response computing device 112 also includes one or more storage devices 210 storing one or more computer modules such as an orchestration layer module 252 for managing and/or controlling operations of the modules in the storage 210, a language determination module 254 for determining a language of the review in the harvested content 117 and providing translations where needed, a text analytics module 256 for analyzing the text and providing opinion or sentiment mining which may use computational natural language processing to automatically identify and extract opinion or sentiment from within the text segment in the harvested content 117 (e.g. positive, negative, neutral, adverse, etc.), a language understanding model 258 for processing the text in the harvested content 117 and splitting the passage in the text segment into utterances or otherwise meaningful sentence components (e.g. words or sentences providing a meaning), a response generator API 260 for composing a textual response to the received review in the harvested content 117 provided via an app service 262, an auto responder web app 264 for transmitting the response (e.g. if a defined threshold is met for a confidence score associated with the generated response by the response generator API) provided by a second app service 266. In at least some implementations, data generated and/or used by the modules in the storage 210 is stored within an SQL database 268 to manage data stored in tabular form and may contain data relating to the analysis and/or generation of responses for the online reviews in one or more tables that relate to each other.

Conveniently, the response generator API 260 is configured to classify the review content (e.g. harvested content 117) into different categories based on machine learning classification applied in the language understanding model 258 to break down the review content into relevant utterance components of a sentence and thus categorize the received review content into categories based on previously defined groups of intent. For example, such intent categories may include but not limited to: "Good Service", "Slow Service", "Employee Misconduct", "Theft Or Fraud", etc.

Figure 3:
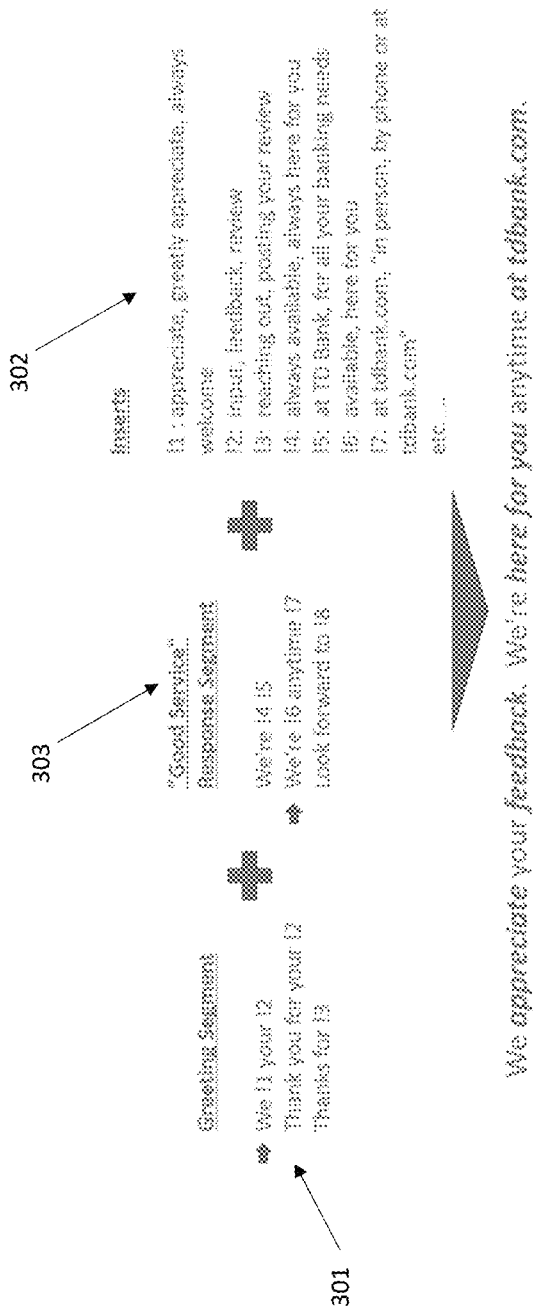
FIG. 3 is a diagram illustrating an example of the generation of the automated response using sentence segments and inserts for the response computing device of FIGS. 1A and 1B, in accordance with an embodiment.

Thus, in at least some aspects, once the language understanding model 258 of FIG. 2 analyzes the content of the review in the harvested content 117 (and broken it down into its relevant utterances), it may generate the primary intent for the review content along with a confidence score. The response generator API 260 may then formulate a tailored response based on the primary intent of the content. An example of the process for generating such a response segment is shown in FIG. 3. For example, for a particular "Good Service" primary intent review, the response generator API 260 may first select one of the possible segment options for an initial introductory sentence for the reply (e.g. "greeting segment") from a catalog of introductory segments which may be stored on the SQL database 268. In this example, the response generator API 260 may be configured to select a positive greeting segment from the catalog based on the primary intent having a positive sentiment. The greeting segment may be customized automatically as shown at sentence segment 301 with a number of possible inserts 302. Subsequently, the response generator API 260 may then automatically select a subsequent sentence segment from a set of sentence segments for the primary intent. The subsequent sentence segment shown as the response segment 303 to further address the review is also selected from a catalog of sentence segments based on the primary intent. Thus, in the response segment 303, one of the possible segment options (having gaps therein for further customization) for the primary intent "Good Service" is automatically selected by the response generator API 260. The completed response is then built by concatenating the segments (e.g. 301 and 303) and performing word substitutions for each gap using a set of inserts (e.g. possible inserts 302). Thus, in at least some embodiments, the response generator API 260 automatically and efficiently provides a focused, tailored response to the received review that is appropriate for the intent of the review.

In some aspects, the response computing device 112 is further configured to log the responses that the system 100 has automatically generated over a past time period, the auto response model in the response generator API 260 may additionally ensure that the same responses are not repeated (e.g. at least for users having some commonality of attributes between them). In one example, for businesses that have multiple locations, the uniqueness of the responses generated by the response generator API 260 can also extend to a certain region or distance parameter.

Thus, the response generator API 260 may be configured, in some embodiments, to store prior generated responses to reviews (e.g. relational data stored in SQL database 268) and associated metadata including to which computing devices (e.g. user device 102) the response was sent to and for which offering entity the review relates. Additionally, the response generator API 260 may be configured to determine which entity the input content 119 received as the harvested content 117 relates to and collect a location for that entity. Each entity may then be assigned a distance parameter such that responses generated by the response generator API 260 may be checked against the distance parameter and ensure that similar responses are not sent to another entity being located within the distance parameter assigned to the first entity. Thus, the response generator API 260 may then select different inserts for the sentence segments in the response, in accordance with the primary intent of the review content such as to ensure a difference between responses generated with respect to entity locations near one another (e.g. as set by a distance parameter). Thus, responses generated within a certain perimeter of the location of the entity to which the review relates and/or location of the user inputting the online review are uniquely generated.

Preferably, in this example, the distance parameters would be smaller in defined regions of higher population density or where the business has a greater number of locations.

Communication channels 232 may couple each of the components including processor(s) 202, input device(s) 204, communication unit(s) 206, output device(s) 208, memory 230, storage device(s) 210, and the modules stored therein for inter-component communications, whether communicatively, physically and/or operatively. In some examples, communication channels 232 may include a system bus, a network connection, an inter-process communication data structure, or any other method for communicating data.

One or more processors 202 may implement functionality and/or execute instructions within the response computing device 112. For example, processors 202 may be configured to receive instructions and/or data from storage devices 210 to execute the functionality of the modules shown in FIG. 2, among others (e.g. operating system, applications, etc.). Response computing device 112 may store data or metadata information relating to the generation, analysis and communication of harvested content 117 and response thereto to storage devices 210. Some of the functionality is described further herein below.

One or more communication units 206 may communicate with external computing devices (e.g. computing devices shown in FIG. 1A) via one or more networks (e.g. communications network 108) by transmitting and/or receiving network signals on the one or more networks. The communication units 206 may include various antennae and/or network interface cards, etc. for wireless and/or wired communications.

Input devices 204 and output devices 208 may include any of one or more buttons, switches, pointing devices, cameras, a keyboard, a microphone, one or more sensors (e.g. biometric, etc.) a speaker, a bell, one or more lights, etc. One or more of same may be coupled via a universal serial bus (USB) or other communication channel (e.g. communication channels 232).

The one or more storage devices 210 may store instructions and/or data for processing during operation of the response computing device 112. The one or more storage devices 210 may take different forms and/or configurations, for example, as short-term memory or long-term memory. Storage devices 210 may be configured for short-term storage of information as volatile memory, which does not retain stored contents when power is removed. Volatile memory examples include random access memory (RAM), dynamic random access memory (DRAM), static random access memory (SRAM), etc. Storage devices 210, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

The response computing device 112 may include additional computing modules or data stores in various embodiments. Additional modules, data stores and devices that may be included in various embodiments may be not be shown in FIG. 2 to avoid undue complexity of the description.

Communications unit 206 may be configured to communicate various data between components of the response computing device 112, its internal modules shown in the storage 210 and other computing devices shown in FIG. 1A.

The orchestration layer module 252 is configured to monitor the input reviews provided in the harvested content 117, and serves to provide at least one of: allocate resources to the modules of the storage 210 for the generation and/or transmission of automated response reviews, monitor operations of the modules in the storage 210, present user interface 129 and process content received from an admin user 105 response, and perform error correction in the operations of the modules of the storage 210. Thus, the orchestration layer module 252 may provide a centralized control of the operations of the modules (e.g. language determination module 254, text analytics module 256, language understanding model 258, response generator API 260, app service 262, auto responder web app 264, second app service 266, and SQL database 268). The orchestration layer module 252 may thus be configured to monitor the operations of the modules in the storage 210, route traffic and data as needed to perform the operations described herein, adjust the operations of the modules (e.g. in response to admin feedback or based on prior performance of reviews) to achieve optimal response generation.

Referring to FIGS. 1A, 1B, 1C and 2, the language determination module 254 receives at least one online review in the harvested content 117. An example review input may be such as that shown in the input content 119. The language determination module 254 first determines a language of the submitted review as shown in the detected language information 122 and if needed, translates the text to another defined language (i.e. English) that can be processed by the modules of the storage 210.

The text analytics module 256 is configured to analyze the text of the review processed by the language determination module 254 for the harvested content 117 (which may be by segmenting the text in the review into individual sentences, utterances, portions of the sentences or reviewing it as a whole) and to perform opinion mining such as to determine an opinion or sentiment for the review (e.g. neutral, or positive, etc.). An example of the analyzed review shown as the analyzed review information 126. In at least some embodiments, the language understanding model 258 is further configured to determine one or more sentiments for the processed review. The language understanding model 258 may then determine a primary (or top confidence scoring) intent of the review, as processed into its utterances and shown as the analyzed review information 226 and assign a confidence score to that determination of intent. An example of the primary intent is shown as a top scoring intent, in the primary intent information 130 on the response user interface 129. The confidence score may be determined by comparing one or more selected portions of the text in the online review (e.g. as determined to be relevant to the review) to a set of example utterances associated with a set of pre-defined intents in the model (see FIG. 4 for an example chart of defined relationship table of mappings between example intents 401 identified in the model, a description 402 for each of the intents, and a set of one or more associated example utterances 403 for each intent identified). Such a table may be stored in the storage 210. The language understanding model 258 may, in some embodiments, apply a machine learning classification or prediction model to determine which intent closely aligns with the text in the review based on a defined table of intents defined in the model, description of intents, and example utterances such as that shown in FIG. 4. Thus the confidence score generated for the primary intent is a similarity measure which quantifies a degree of match between one or more portions of the text in the review (e.g. analyzed review information 126 such as provided in harvested content 117) and a set of stored example utterances as shown in FIG. 4 for each of the pre-defined intents in the model. An example of such a confidence score is shown as the confidence score information 132.

Thus, in at least some aspects, the confidence score generated by the language understanding model 258 is associated with the confidence for selecting and assigning the primary intent attributed to the text in the review provided in the harvested content 117 (e.g. initially provided as input content 119).

The language understanding model 258 may assign more than one possible intent to the text in a particular review. These intents may be pre-defined with associated metadata for assisting the language understanding model 258 in determining the intent(s). Example intents 401 stored for the language understanding model 258 and shown in FIG. 4, may include attrition risk, availability issues, employee misconduct, good service, slow service, poor conditions, inability to help, and theft or fraud. Thus, certain utterances in the text segment for the review may be associated with each intent and these may be used to train a predictive or supervised machine learning model for the language understanding model in making its determination of which intent is primarily associated with a particular review based on a closest degree of match with example utterances as shown in FIG. 4.

In at least some embodiments of FIGS. 1A-1C and 2, the response computing device 112 is configured, via the orchestration layer module 252, to generate an automated response to a given review via a response generator API 260 and to automatically respond with that automated response via the auto responder web app 264 if the assigned confidence score (e.g. shown in the confidence score information 132) exceeds a minimum respective threshold score configured for each of these actions.

Thus, in at least some aspects of the response computing device 112 of FIGS. 1A-1C and 2, if the assigned confidence score for the primary intent exceeds a defined minimum score for both auto generation of a reply to the review and auto responding (e.g. first threshold 134, second threshold 136), the orchestration layer module 252 will cause the auto responder web app 264 to automatically reply (e.g. to the user device 102 and instruct the display thereon) with an automated response generated by the response generator API 260. In some implementations, the response computing device 112 will auto-translate the response to a same language as the review being responded to.

In another embodiment, if the assigned confidence score, as shown in the score information 132 exceeds the minimum score for auto generation of the response (e.g. a first threshold 134) but not the minimum score for auto respond (e.g. a second threshold 136), the response computing device 112 will generate an automated response to the analyzed review as per the methods described herein, but may present the case on the response user interface 129 for approval of the automated response by the admin user 105 prior to replying.

In another embodiment, the orchestration layer module 252 determines that the determined confidence score for the primary intent as shown in the score information 132 may not meet the minimum score for automatic generation of a response and thus the proposed response and the score may be provided on the response user interface 129 for the admin to determine whether the first threshold 134 and/or second threshold 136 requires modification and if so, the modification causing the orchestration layer module 252 to revise the processes of the modules contained in the storage 210 and thus generate a revised response.

Preferably in at least some embodiments, the orchestration layer module 252 is configured to present a plurality of user interface controls on the response user interface 129 to allow the admin user 105 to adjust and set minimum score(s) for auto generation of a response and/or auto response to a review.

Thus, the response generator API 260 and the auto responder web app 264 are configured such that a determined confidence score for the primary intent of the review as generated by the language understanding model is compared to configurable thresholds for auto-generating a response and auto-responding with the response (e.g. first threshold 134 and second threshold 136). Thus, the comparison between the confidence score and each of the configurable thresholds may be used by the orchestration layer module 252 to co-ordinate the modules to 1) generate an automated response to the review and 2) to automatically respond with that automated response (e.g. see FIG. 1B for examples of configurable thresholds).

In at least some embodiments and referring to FIGS. 1A-1C, 2 and 3, the response generator API 260 is configured for automatically generating a unique response to the text in an online review (e.g. input content 119 collected as the harvested content 117) and involves combining a defined set of introductory sentence segment(s) 301 retrieved or accessed for the primary intent of the review (e.g. having gaps or blanks in the sentence segment for being filled in) and associated set of possible inserts 302 having textual content and associated metadata for filling in the gaps in the sentence segment 301 to generate a custom response segment 303 which considers the primary intent for the generation of the response (e.g. as the inserts and/or greeting segments specifically retrieved based on the defined primary intent). As shown by the example in FIG. 3, a response to a review may be comprised of a "greeting segment" in the sentence segment 301 and an intent-specific "response segment" in the response segment 303 selected based on the primary intent identified by the language understanding model 258. Each sentence segment is thus comprised of one or more gaps of content that which may be filled in with one of many pre-selected options specific to the primary intent determined. The various combinations of possible segments and inserts results in a large number permutations and unique responses customized to the determined intent as shown in the response segment 303.

It is understood that operations may not fall exactly within the modules and/or models of FIG. 2 such that one module and/or model may assist with the functionality of another.

Figure 5:
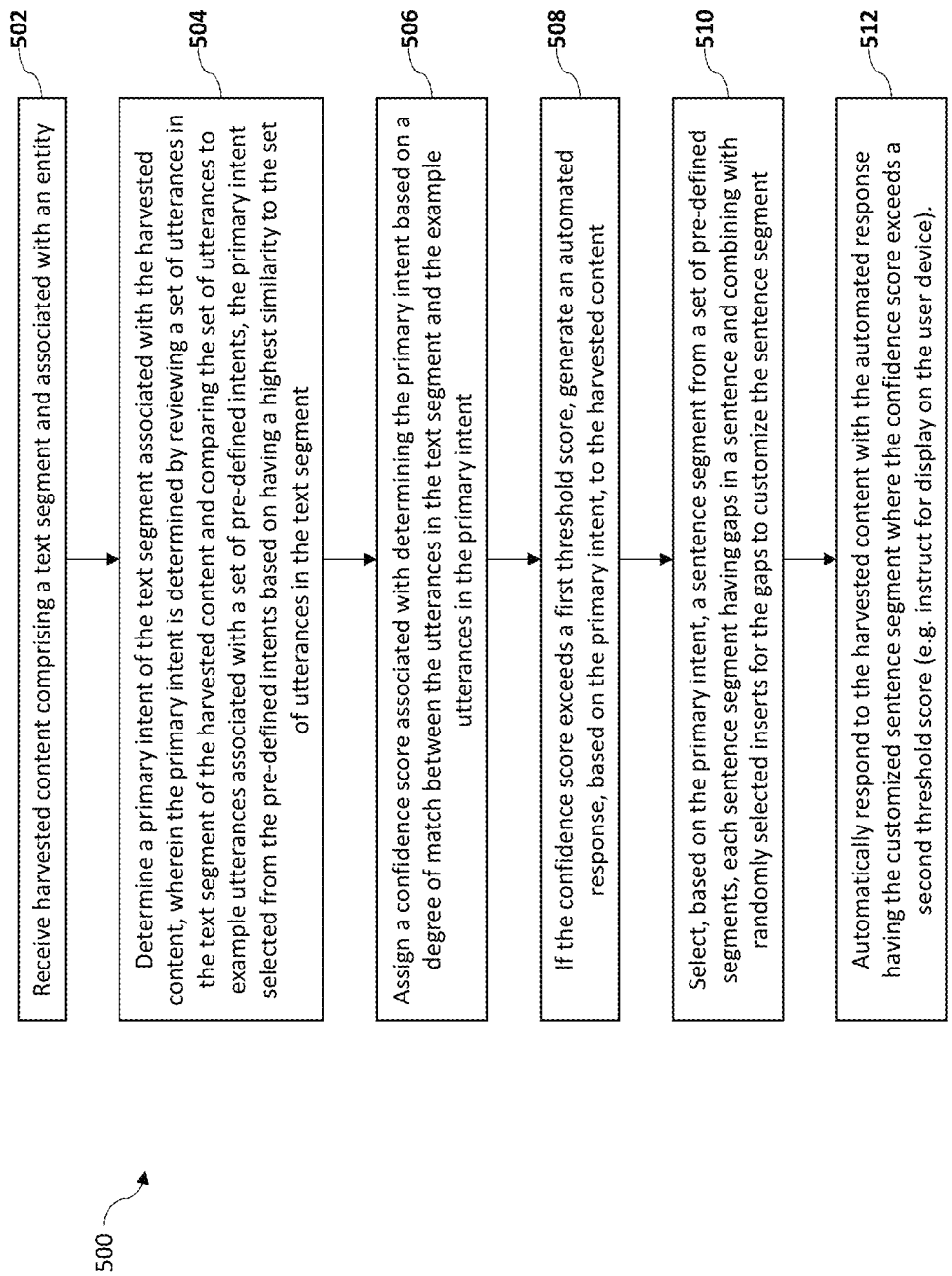
FIG. 5 is a flowchart illustrating example operations of a computing device, e.g. the response computing device, in accordance with an embodiment.

FIG. 5 is a flowchart of operations 500 which may be performed by a computing device, such as the response computing device 112 illustrated in FIGS. 1A-1C and 2. As described earlier, the response computing device 112 may comprise at least a processor configured to communicate with at least one display (e.g. response user interface 129, and GUI 116 on the user device 102). In at least some implementations, the response computing device 112 receives input including harvested content 117 collected across the networked computer review response system 100 from one or more computers providing user input content such as an online reviews provided by a user online including through social media platforms 110, websites for products or services for an entity, a local application for the entity stored on the computing device(s) of the system 100, etc. The harvested content 117 is used by the response computing device 112 to predict, e.g. using a machine learning model, at least one primary intent in response to the user input content, e.g. harvested content 117. Notably, the response computing device 112 stores instructions (stored in a non-transient storage device), which when executed by the processor, configure the response computing device 112 to perform operations such as operations 500.

The operations 500 may be implemented by at least one processor executing instructions stored on a memory. For simplicity, the operations 500 will be generally described in the context of a single online review for a single merchant entity offering of a product or service. However, it should be understood that the operations 500 may be carried out in the context of a batch of online reviews collected from one or more computing sources of user input content (e.g. multiple user device(s) 102) for various merchant entity offerings of products or services.

First, at 502, operations of the response computing device 112 are configured for receiving harvested content (e.g. user input content providing an online review of a product or service related to an entity) which may be received from one or more computing devices of the system 100, including via the GUI 116 of the user device 102 (e.g. providing input content 119 for the review). The harvested content comprises a text segment for the review of the entity (e.g. a product or service associated with the entity). Optionally, the review may be submitted via a reviewer's electronic computing device via a user interface (e.g. the GUI 116) displayed thereon. Optionally, the user device 102 may locally store the received review (e.g. provided as input content 119) or stored in an external database such as the component content management system 114 or stored and queued within the service management platform 106 or otherwise stored on another database for access as harvested content 117 by the response computing device 112. Optionally, the review may also be stored along with attributes for the review such as identifying information for the user submitting the review which may be collected on the GUI 116 such as provided in the third view portion 123 of FIG. 1A. Such attributes may also be collected in the harvested content 117.

Optionally, in some aspects, the review input by a user (e.g. via a user device 102) may be initially provided in other multimedia formats other than text format as collected in the harvested content 117, such as speech or video etc., and may be converted by the response computing device 112 using speech to text conversion or other audio to text mapping methods as may be envisaged.

At step 504, operations of the response computing device 112, initiate determining a primary intent of the text segment in the harvested content 117. Such primary intent may be determined by calculating a degree of match or similarity between at least portions of the text in the harvested content 117, such as a set of utterances in the text segment of the harvested content 117, and a set of example utterances associated with a corresponding set of pre-defined intents. The primary intent is selected as the one having the highest degree of similarity whereby the degree of match between the text segment in the review as provided in the harvested content 117 (e.g. a set of words, a sentence, a passage, a discourse, etc. that conveys a certain meaning, intent or sentiment) and the example utterances in the primary intent is higher than for any other intent. Such mappings between stored set of defined intents (e.g. which include within the set of defined intents, the primary intent having a closest degree of similarity) and the example utterances such as the example mappings between example utterances and intents shown in FIG. 4 may be stored as a table in a storage 210, such as the SQL database 268.

Following determining the primary intent in step 504 as having a highest similarity to the set of utterances in the text segment of the harvested content, then at step 506, a confidence score is assigned based on a degree of match for generating the primary intent, e.g. a degree of similarity between the utterances in the text segment and the example utterances in the primary intent. For example, as shown in FIG. 1B, an input review provided on a user device 102 and processed into the review information 124, may be analyzed into utterances as shown in the analyzed review information 126. In this example, the primary intent of the textual review is determined to be attrition risk (e.g. first row in FIG. 4), based on comparing the text segments in the query of the analyzed review information 126 to the example utterances for various defined intents for the models. The degree of match between the utterance for the primary intent and the portions of the text in the analyzed review information is shown as the confidence score in the score information 132.

At 508, if the confidence score exceeds a first threshold score (e.g. customizable threshold shown as first threshold 134), then the response computing device 112 is triggered to auto generate a response to the harvested content providing the user input review based on the primary intent, such as that shown in the generated response 128.

Once the criteria at 508 is met, at 510, the response computing device 112 is configured to select based on the primary intent a sentence segment from a set of sentence segments. An example of this is shown at FIG. 3, where a greeting segment may be selected first and then a more specific intent driven sentence segment is selected in the response segment 303 and combined with one or more randomly selected possible inserts 302 for gaps in the response segment 303. In this way, by the sentence segment having gaps in a sentence and combining it with randomly selected inserts for the gaps to customize the sentence segment, a custom response may be generated.

In at least some aspects, at step 512, the response computing device 112 is further configured after generating the response at step 510 to automatically respond (e.g. communicate a response and instruct the display thereof on the user device 102). Notably, the response computing device 112 is configured to automatically respond to the harvested content 117 with the automated response 125 having the customized sentence segment (e.g. as illustrated in the response 121) when the confidence score (e.g. score information 132) exceeds a second threshold score (e.g. the second threshold 136).

In at least some aspects, the harvested content 117 comprises user input content collected from one or more websites and/or applications and associated computing devices providing an online review of at least one product or service for the entity.

In at least some aspects, the response computing device 112 is further configured such that the primary intent is selected by determining a set of possible intents from each of the utterances (e.g. see the analyzed review information 126 in FIG. 1B having multiple intents and associated confidence scores for each utterance in the text for the review) and selecting one of the possible intents for having a highest confidence score for matching between the utterances in the text segment of the online review to the example utterance associated with the primary intent (e.g. in FIG. 1B, the attrition risk intent has the highest confidence score and thus selected as the primary intent).

In some aspects of the response computing device 112, generating the automated response 125 includes automatically selecting at least one additional greeting segment, e.g. sentence segment 301 in FIG. 3, to precede the sentence segment in the automated response 125 such that the additional greeting segment is selected from a set of pre-defined greeting segments common to all of the pre-defined intents for the entity and includes a set of sentence gaps for being filled with randomly generated inserts associated with the greeting segments. An example of this is shown at the sentence segments 301 and possible inserts 302.

In some aspects, the response computing device 112 is further configured to apply a machine learning model in the language understanding model 258 of FIG. 2 for grouping or similarity based clustering the utterances in the text segment of the online review to example utterances in the pre-defined intents and selecting a group or cluster having similar language properties (e.g. similar key words and sequence of words) to the utterances as the primary intent.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using wired or wireless technologies, such are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more general purpose microprocessors, application specific integrated circuits (ASICs), field programmable logic arrays (FPGAs), digital signal processors (DSPs), or other similar integrated or discrete logic circuitry. The term "processor," as used herein may refer to any of the foregoing examples or any other suitable structure to implement the described techniques. In addition, in some aspects, the functionality described may be provided within dedicated software modules and/or hardware. Also, the techniques could be fully implemented in one or more circuits or logic elements. The techniques of this disclosure may be implemented in a wide variety of devices or apparatuses, an integrated circuit (IC) or a set of ICs (e.g., a chip set).

One or more currently preferred embodiments have been described by way of example. It will be apparent to persons skilled in the art that a number of variations and modifications can be made without departing from the scope of the disclosure as defined in the claims.

What is claimed is:

1. A computer system for automatically responding to harvested content, the computer system comprising:
   a computer processor; and
   a non-transitory computer-readable storage medium storage having instructions that when executed by the computer processor perform actions comprising:
      receiving harvested content comprising a text segment and associated with an entity;
      using a machine learning model to:
         compile a set of utterances in the text segment of the harvested content, and
         generate a confidence score for each utterance in the set of utterances by analyzing similarity of each utterance with example utterances associated with a set of pre-defined intents, wherein the confidence scores are dynamically weighted based on contextual relevance derived from metadata associated with the harvested content;
      determining the utterance of the set of utterances having a highest confidence score to determine the primary intent of the text segment;
      wherein when the highest confidence score is above a first threshold score,
      determining a primary intent of the text segment associated with the harvested content, wherein the primary intent is determined by reviewing a set of utterances in the text segment of the harvested content and comparing the set of utterances to example utterances associated with a set of pre-defined intents, the primary intent selected from the pre-defined intents based on having a highest similarity to the set of utterances in the text segment;
      assigning a confidence score associated with determining the primary intent based on a degree of match between the utterances in the text segment and the example utterances in the primary intent;
      when the confidence score exceeds a first threshold score, generating an automated response, based on the primary intent, to the harvested content, wherein the automated response is generated by:
         selecting, based on the primary intent, a sentence segment from a set of pre-defined segments, each sentence segment having gaps in a sentence and combining with randomly selected inserts for the gaps to customize the sentence segment; and
      wherein when the highest confidence score exceeds the first threshold score but does not exceed a second threshold score, flagging the automated response for review by actively displaying a user interface configured to present configurable threshold sliders and the confidence score; and
      wherein when the highest confidence score exceeds the second threshold score, automatically responding to the harvested content with the automated response having the customized sentence segment.

2. The system of claim 1, wherein the harvested content comprises user input content collected from one or more websites providing an online review of at least one product or service for the entity.

3. The system of claim 2, the actions further comprising: determining a first language of the online review and translating the online review from the first language to a second language associated with the pre-defined intents.

4. The system of claim 2, wherein the first threshold score is configurable on a user interface of a computing device for managing the online reviews.

5. The system of claim 4, wherein the second threshold score is configurable on the user interface of the computing device.

6. The system of claim 5, wherein the automated response is generated unique to a set of online reviews defined by region or time.

7. The system of claim 2, wherein the primary intent is selected by determining a set of possible intents from each of the utterances and selecting one of the possible intents for having the highest confidence score for matching between the utterances in the text segment of the online review to the example utterance associated with the primary intent.

8. The system of claim 2, the actions further comprising: determining a location associated with the online review and wherein automatically responding to the online review further comprises updating the automated response with another combination of pre-defined sentence segments and selected inserts when the automated response matches a prior response generated in response to a prior online review at a same location to the location of the online review.

9. The system of claim 2, wherein generating the automated response further comprises:
automatically selecting at least one additional greeting segment to precede the sentence segment in the automated response, the one additional greeting segment selected from a set of pre-defined greeting segments common to all of the pre-defined intents for the entity and including a set of sentence gaps for being filled with randomly generated inserts associated with the greeting segments.

10. The system of claim 2, the actions further comprising applying the machine learning model for grouping the utterances in the text segment of the online review to example utterances in the pre-defined intents and selecting a group having similar language properties to the utterances as the primary intent.

11. A non-transitory computer-readable storage medium comprising instructions executable by a processor to configure the processor for automatically responding to harvested content, the instructions comprising steps for the processor to:
receive harvested content comprising a text segment and associated with an entity;
use a machine learning model to:
compile a set of utterances in the text segment of the harvested content, and
generate a confidence score for each utterance in the set of utterances by analyzing similarity of each utterance with example utterances associated with a set of pre-defined intents, wherein the confidence scores are dynamically weighted based on contextual relevance derived from metadata associated with the harvested content;
determining the utterance of the set of utterances having a highest confidence score to determine the primary intent of the text segment;
wherein when the highest confidence score is above a first threshold score, an automated response is generated by:
selecting, based on the primary intent, a sentence segment from a set of pre-defined segments, each sentence segment having gaps in a sentence and combining with randomly selected inserts for the gaps to customize the sentence segment; and
wherein when the highest confidence score exceeds the first threshold score but does not exceed a second threshold score, flagging the automated response for review by actively displaying a user interface configured to present configurable threshold sliders and the confidence score; and
wherein when the highest confidence score exceeds the second threshold score, automatically responding to the harvested content with the automated response having the customized sentence segment.

12. The non-transitory computer-readable storage medium of claim 11, wherein the harvested content comprises user input content collected from one or more websites providing an online review of at least one product or service for the entity.

13. A computer implemented method for responding to harvested content, the method comprising:
receiving harvested content comprising a text segment and associated with an entity;
using a machine learning model to:
compile a set of utterances in the text segment of the harvested content, and
generate a confidence score for each utterance in the set of utterances by analyzing similarity of each utterance with example utterances associated with a set of pre-defined intents, wherein the confidence scores are dynamically weighted based on contextual relevance derived from metadata associated with the harvested content;
determine the utterance of the set of utterances having a highest confidence score to determine the primary intent of the text segment;
wherein when the highest confidence score is above a first threshold score, an automated response is generated by:
selecting, based on the primary intent, a sentence segment from a set of pre-defined segments, each sentence segment having gaps in a sentence and combining with randomly selected inserts for the gaps to customize the sentence segment; and
wherein when the highest confidence score exceeds the first threshold score but does not exceed a second threshold score, flagging the automated response for review by actively displaying a user interface configured to present configurable threshold sliders and the confidence score; and
wherein when the highest confidence score exceeds the second threshold score, automatically responding to the harvested content with the automated response having the customized sentence segment.

14. The method of claim 13, wherein the harvested content comprises user input content collected from one or more websites providing an online review of at least one product or service for the entity.

15. The method of claim 14, further comprising:
determining a first language of the online review and translating the online review from the first language to a second language associated with the pre-defined intents.

16. The method of claim 14, wherein the first threshold score is configurable on a user interface of a computing device for managing the online reviews.

17. The method of claim 16, wherein the second threshold score is configurable on the user interface of the computing device.

18. The method of claim 14, wherein the automated response is unique to a set of online reviews defined by region or time.

19. The method of claim 14, wherein the primary intent is selected by determining a set of possible intents from each of the utterances and selecting one of the possible intents for having the highest confidence score for matching between the utterances to the example utterance associated with the primary intent.

20. The method of claim 14, further comprising determining a location associated with the online review and wherein automatically responding to the online review further comprises updating the automated response with another combination of pre-defined sentence segments and selected inserts when the automated response matches a prior response generated in response to a prior online review at a same location to the location of the online review.

21. The method of claim 14, wherein generating the automated response further comprises:
automatically selecting at least one additional greeting segment to precede the sentence segment in the automated response, the one additional greeting segment selected from a set of pre-defined greeting segments common to all of the pre-defined intents for the entity and including a set of sentence gaps for being filled with randomly generated inserts associated with the greeting segments.

22. The method of claim 14, further comprising applying the machine learning model for grouping the utterances in the text segment of the online review as compared to example utterances in the pre-defined intents and selecting a cluster group having similar language properties to the utterances as the primary intent.

* * * * *